Aug. 19, 1958     C. LEHMAN     2,848,185
WEIGHING MACHINE

Filed Aug. 13, 1951     3 Sheets-Sheet 1

INVENTOR.
Carl Lehman
BY Lyon & Lyon
ATTORNEYS

Aug. 19, 1958 C. LEHMAN 2,848,185
WEIGHING MACHINE
Filed Aug. 13, 1951 3 Sheets-Sheet 2
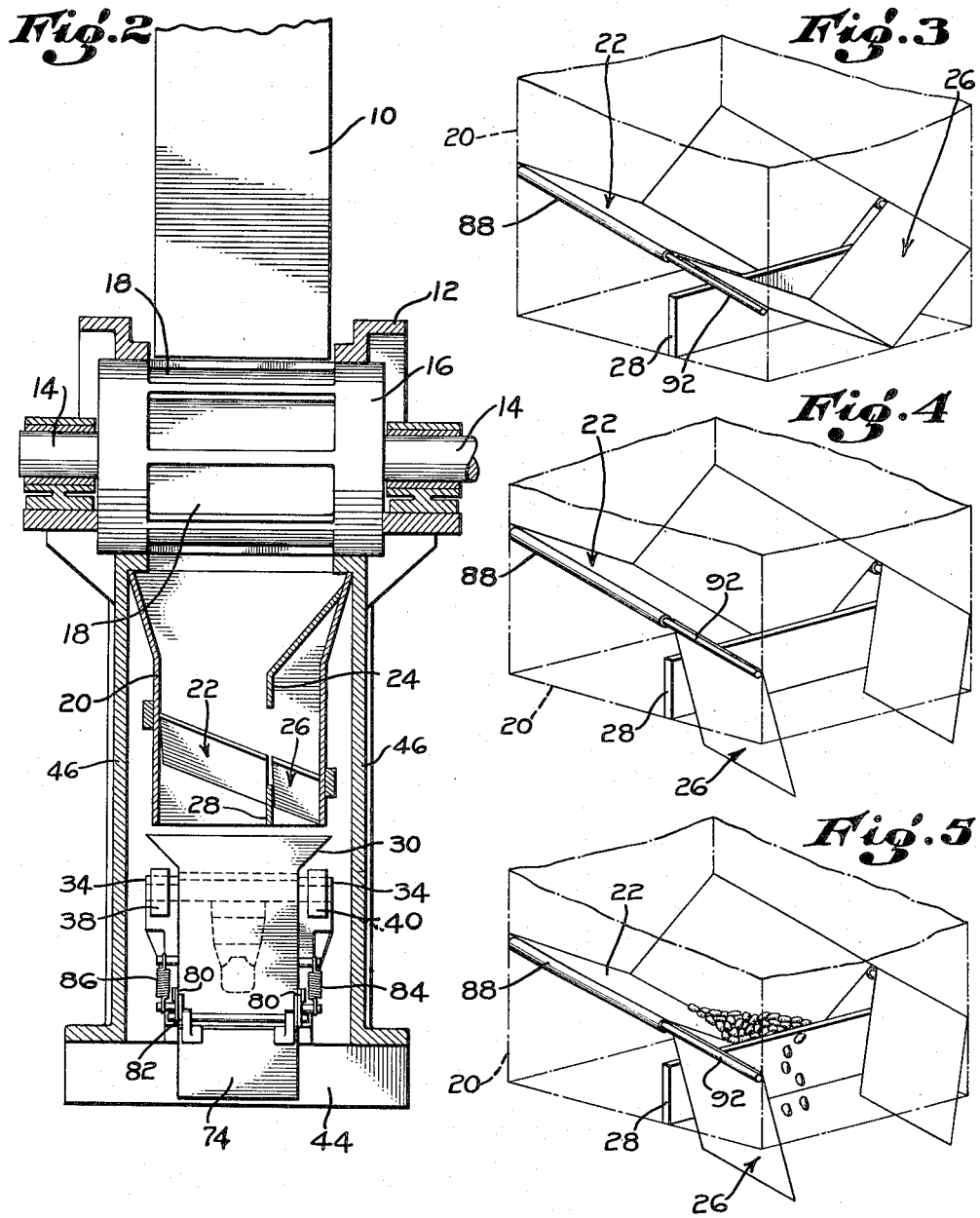
INVENTOR.
Carl Lehman
BY
Lyon & Lyon
ATTORNEYS Aug. 19, 1958  C. LEHMAN  2,848,185
WEIGHING MACHINE
Filed Aug. 13, 1951  3 Sheets-Sheet 3
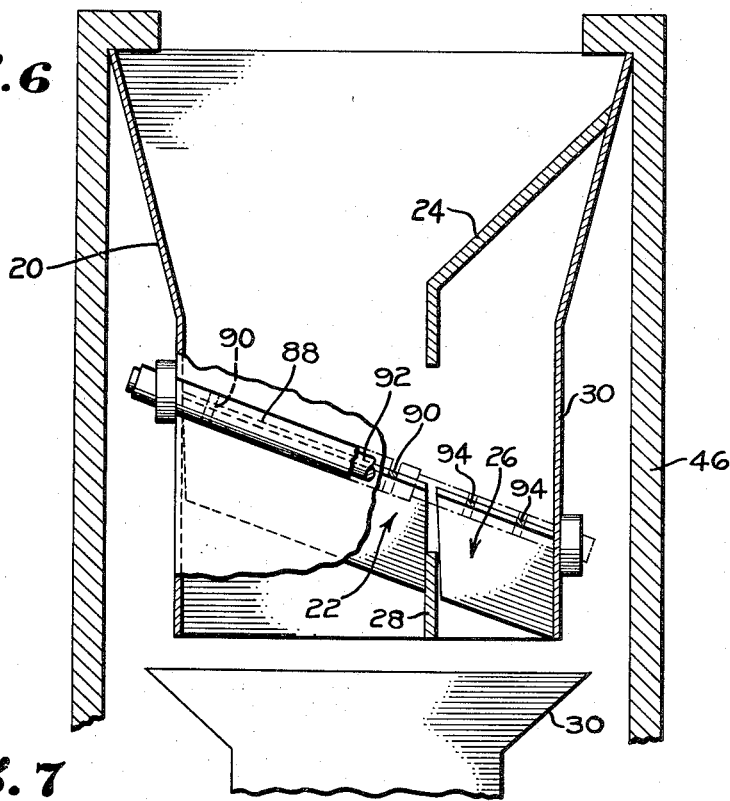
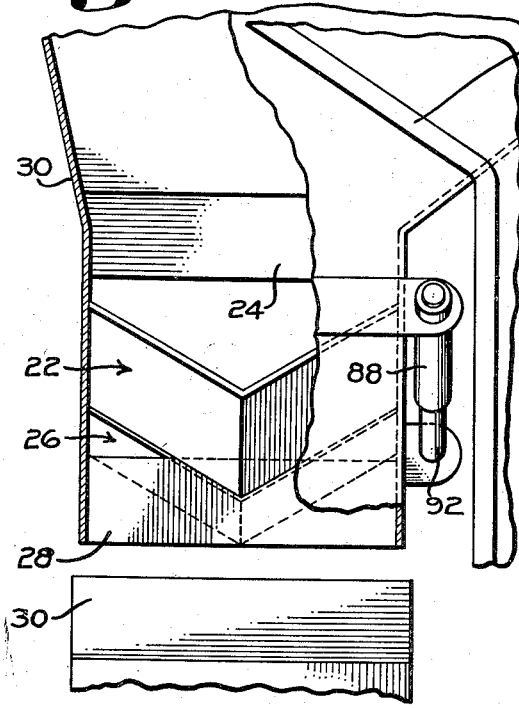
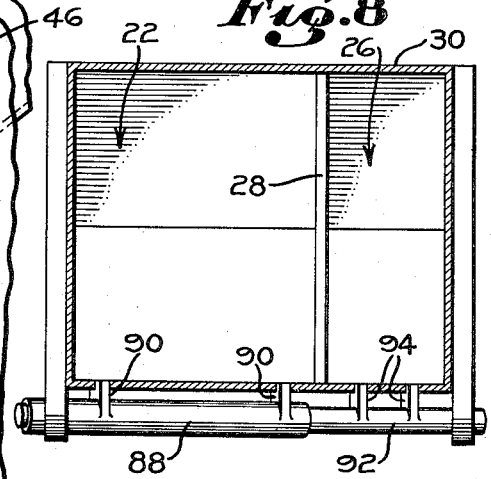
INVENTOR.
Carl Lehman
BY Lyon & Lyon
ATTORNEYS United States Patent Office 2,848,185
Patented Aug. 19, 1958

2,848,185

WEIGHING MACHINE

Carl Lehman, Fresno, Calif.

Application August 13, 1951, Serial No. 241,515

5 Claims. (Cl. 249—16)

This invention relates to an improved weighing machine.

It is an object of this invention to provide a machine for weighing a predetermined bulk of a suitable material. Hereinafter the material being weighed will be referred to as raisins. However, this is for the purpose of illustration and it is not intended to limit the device to the weighing of this commodity.

It is a further object of this invention to provide a weighing device wherein a main charge of the raisins is first released and wherein a secondary charge of raisins is subsequently released so that the combined weight of both charges is equal to the desired weight.

It is a further object of this invention to provide a stabilizing hesitation between the discharge through the main feed means and through the precision feed means.

It is a further object of this invention to provide a self-damping weighing means to provide a more accurate measure of the weight.

It is still a further object to provide a machine wherein the self-damping of the weighing means occurs during the stabilizing hesitation between discharge of the main feed means and precision feed means.

Further objects and advantages of this invention will be apparent from the following description.

In the drawings:

Figure 2 is an end elevation in section;

Figure 3 is a diagrammatic view of the main and secondary gates;

Figure 4 is a diagrammatic view similar to Figure 3 with the precision gate open;

Figure 5 is a diagrammatic view similar to Figure 3 with the precision gate open and illustrating the dribble feed;

Figure 6 is an enlarged view in section of the gates;

Figure 7 is a fragmentary side elevation partially in section of the feed gates; and Figure 8 is a top plan view in section of the gates.

Figure 1:
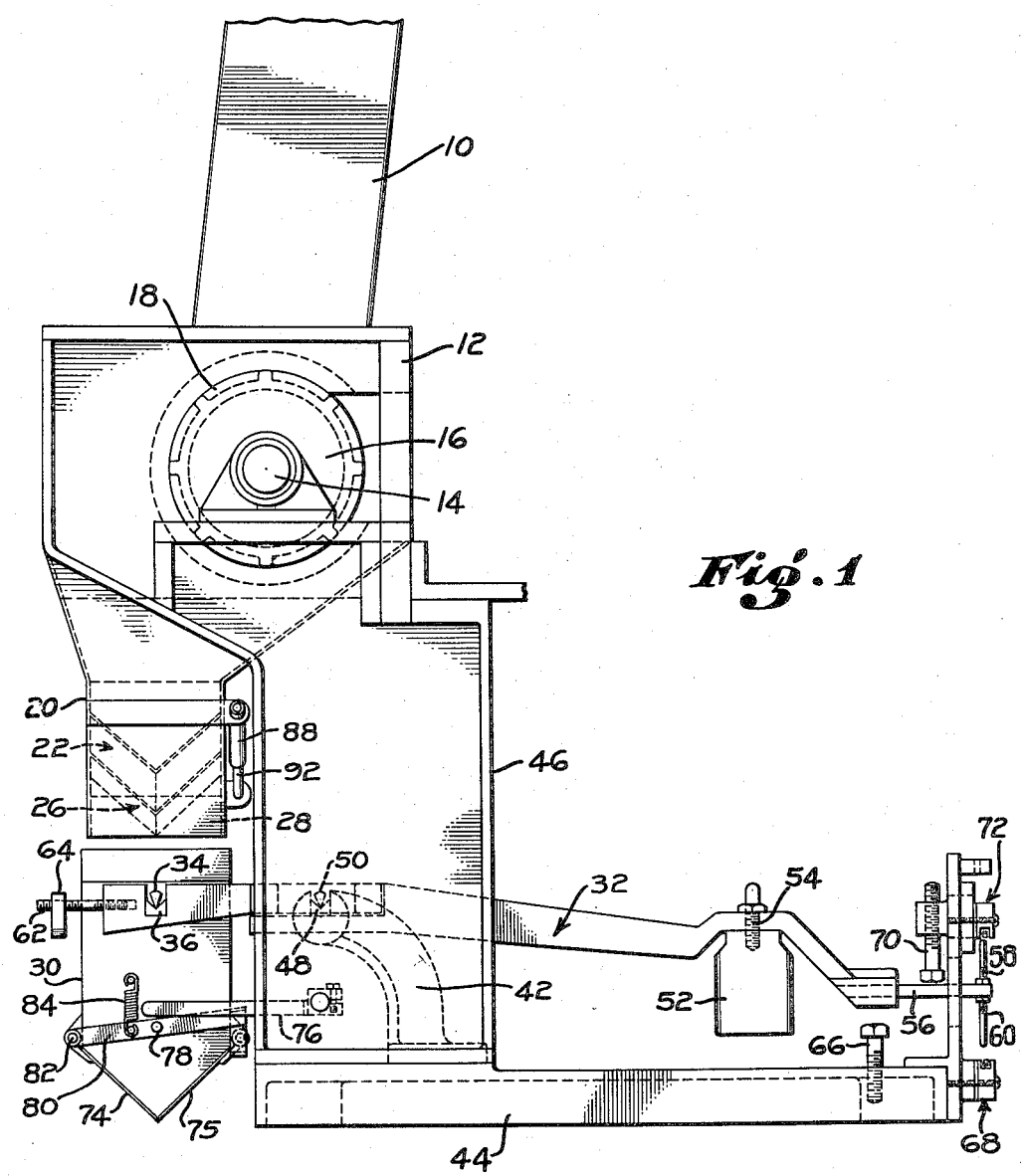
Figure 1 is a side elevation of the weighing machine embodying this invention.

Referring now to Figures 1 and 2, the material to be weighed, such as raisins, are fed into a hopper 10 from a suitable source, not shown. Rotatably mounted in a drum housing 12 about a shaft 14 journaled in said housing is the feeder drum 16. The drum 16 has about its periphery a plurality of recessed sections 18 which are adapted to receive the raisins from the hopper 10. The feeder drum 16 fits snugly within the housing 12 so that the raisins can progress from the hopper to the lower portion of the weighing machine only by being carried there in the recessed portions 18 of the feeder drum.

The shaft 14, and hence drum 16, are rotated by a suitable source of power, not shown, and thus the discharge of the raisins delivered to the recessed portions 18 into the control hopper 20 is controlled by the speed of rotation of drum 16. The raisins then drop vertically onto the main feed gate, generally designated 22. A deflector 24 is mounted in the control hopper to divert all of the raisins onto the main feed gate 22. Adjacent the main feed gate 22 is a precision feed gate 26 which is isolated from the raisins delivered to the main feed gate by the deflector 24 and an adjustable divider 28 is provided between the main and precision feed gates for a purpose hereinafter to be described.

The same electrical system, not shown, which actuates the source of power to rotate the feeder drum also functions to open the main gate 22 and precision gate 26 in a manner which will hereinafter be described. Thus the raisins are deflected by the deflector 24 to the open main gate 22 and into the scale hopper 30. The scale hopper is mounted at one extremity of the scale beam 32, having knife edged projections 34 on either side of the scale hopper which are adapted to be retained in suitable bearing surfaces such as 36 formed in each branch 38 and 40 of the forked extremity of the scale beam 32. A fulcrum for the scale beam is formed on arm 42 which is suitably mounted on the base 44 of the frame 46 of the weighing machine. The arm 42 is forked and each branch thereof is provided with suitable bearing surfaces such as 48, each of which bearing surfaces is adapted to receive a knife edged projection such as 50 formed on either side of the scale beam 32.

On the opposed side of the fulcrum from the scale hopper 30, a weight 52 is removably suspended such as by screw 54. Projecting from the scale beam beyond the weight 52 in this embodiment is an arm 56 which has provided thereon adjustable rods 58 and 60. Provided on the scale hopper 30 is a bolt 62 to which weight 64 is attached. It is thus readily apparent that by varying the size of the weight 52 and the size and position of weight 64 that the amount of raisins which must be fed into the scale hopper 30 to balance the scale beam about the fulcrum can be readily adjusted. When the scale hopper is empty the scale beam pivots clockwise until it strikes stop 66. The rod 60 is so adjusted that it will contact and close the main feed gate microswitch 68. As long as this contact is maintained the main gate 22 is retained open. Assuming now that the scale beam has been adjusted so that a charge of twelve ounces of raisins is necessary to pivot the scale beam in a counterclockwise direction when such a charge is passed through the main gate 22, the scale beam pivots upwardly so that the contact between adjustable rod 60 and the microswitch 68 is broken. This opening of switch 68 causes the main gate 22 to close, which closing will hereinafter be described, and the scale beam will balance about the fulcrum. At this point there is a hesitation in the feed to the hopper even though precision gate 26 remains open. The raisins continue to flow into the main gate 22, which gate is mounted in the control hopper 20 at an angle so that the raisins accumulate in the lower end of the gate adjacent the adjustable divider 28. This adjustable divider is positioned so that approximately twelve ounces of raisins will accumulate in the main gate prior to filling that gate up to a point where the raisins will commence to dribble over the adjustable divider, see Figure 5, through open precision gate 26 and into the scale hopper 30. This pause or hesitation serves two useful functions. First, it permits the scale beam to stabilize itself, it being of course apparent that the scale beam is self-damping. If the scale beam bent downwardly so that the weight is below the fulcrum when the beam is in a balanced position, then when the beam is rotated counterclockwise the effective lever arm increases, resisting further raising of weight 52 and quickly reaching the stable position as viewed in Figure 1. Secondly, to accumulate a charge in the main feed gate of approximately twelve ounces preparatory to the next time the gate 22 is open and thus no time is lost during the hesitation period. In providing this hesitation period and the self-damping feature of the scale beam 32, it is apparent that the twelve ounces of raisins in the primary charge come to rest in the scale hopper so that only their weight and not their momentum is applied to the scale hopper. When the scale beam reaches a stable position with the charge of twelve ounces of raisins, it is apparent that it actually functions thereafter to measure only the weight of the dribble feed and this permits a more accurate measure.

Assuming now that the weights on scale beam 32 are adjusted so that it will pivot counterclockwise above the position of balance seen in Figure 1 when the weight in the scale hopper is fifteen ounces, the raisins pass over the divider 28 in the form of a dribble until three additional ounces have passed into the scale hopper. The scale hopper then is sufficiently weighted to cause the scale beam to move counterclockwise upwardly until arm 56 strikes stop 70. The rod 58 is so adjusted that at this time it will strike microswitch 72, closing this switch and actuating means, not shown, to close the precision gate 26, stop the motion of the feeder drum 16 and open the gates 74 and 75 on the bottom of the scale hopper, thus discharging the accurately weighed charge of fifteen ounces of raisins into a suitable bag or receptacle. The opening and closing of the gates may be performed in any suitable manner, and as seen in Figure 1, a solenoid actuated arm 76 strikes pin 78 on arm 80, which arm is pivotally mounted about pin 82 which is retained in suitable brackets formed on the side of scale hopper 30. Rigidly secured to the arm 80 is gate 74 so that rotation of arm 80 in a counterclockwise direction causes the gate 74 to pivot outwardly. A similar control is provided to open gate 75 and springs 84 and 86 tend to close the gates 74 and 75 when the microswitch 72 is again open and the solenoids deenergized. When the charge is emptied from the scale hopper 30, the scale beam 32 pivots clockwise about the fulcrum, breaking contact of rod 58 and microswitch 72, permitting the springs to close the scale hopper gates 74 and 75. The scale beam pivots downwardly until it strikes the stop 66 and rod 60 and closes microswitch 68. The closing of microswitch 68 again energizes the drum rotating means and opens gates 22 and 26. The means for opening these gates may be of any suitable type and herein are illustrated in Figures 6 through 8 as consisting of a shaft 88 which has arms 90 projecting through suitable slots in the walls of the control hopper 30 and attaching to one side of the gate 22. It is of course apparent that by rotating the shaft 88, one side of the gate 22 is caused to rotate with the shaft. The limits of this rotation can be established by the length of the slots formed in the side of the control hopper. A shaft corresponding to shaft 88 may be provided attached to the opposed side of gate 22 and both of these shafts rotate by a common means to open both sides of gate 22.

Journaled in the shaft 88 is a second shaft 92 which has arms 94 projecting through suitable slots formed in the control hopper 30, which arms are attached to one side of the precision gate 26 so that rotation of shaft 92 will pivot one half of gate 26. A shaft corresponding to shaft 92 is similarly attached to the opposed side of the gate 26 and is driven by the same means as shaft 92 to open both sides of the precision gate 26 at the same time. The means for rotating the shaft 88 and its counterpart is controlled by the microswitch 68 so that when the contact between the rod 60 and the microswitch 68 is broken, the shafts are rotated to close the gate 22. Similarly, shaft 92 and its counterpart which control the opening and closing of precision gate 26 are controlled by the microswitches 72 and 68. When the rod 58 contacts microswitch 72, shaft 92 and its counterpart rotate to close the precision gate and when contact between rod 60 and microswitch 68 is again effected, precision gate 26 is opened along with main feed gate 22 and rotation of drum 16.

The operation of this weighing machine is as follows. The material to be weighed is fed into hopper 10. At this time the scale hopper 30 is empty and the scale beam rotates clockwise so that rod 60 closes switch 68. When this switch is closed main feed gate 22 and precision feed gate 26 are opened. At the same time the drum 16 is caused to rotate and the raisins carried in recesses 18 fall into the control hopper where they are directed by deflector 24, through the open main feed gate 22 into scale hopper 30. When a predetermined amount of raisins is in the scale hopper the scale beam is unbalanced, causing it to pivot counterclockwise to a stable position. When the scale beam moves counterclockwise it breaks the contact between rod 60 and switch 68, which causes main feed gate 22 to close. This causes a momentary hesitation until main feed gate 22 fills up to a predetermined level which is determined by adjustable divider 28. During this hesitation the scale beam stabilizes itself at a position between stops 66 and 70. This stabilization is rapidly accomplished because of the self-damping feature of the scale beam created by placing weight 52 below the fulcrum so that the effective lever arm increases and weight 52 moves slightly outward from the fulcrum when the scale beam is rotated counterclockwise.

After main feed gate 22 fills up, raisins dribble over divider 28 into the open precision feed gate 26. This dribble feed is greatly augmented by inclining the main feed gate to the path of travel of the raisins. When a predetermined quantity of raisins has passed through the precision gate into scale hopper 30, the scale beam 32 is again out of balance and pivots counterclockwise until it strikes stop 70, at which time rod 58 strikes switch 72, closing precision gate 26 and stopping drum 16. Gates 74 and 75 open and the full charge of raisins is dumped into a suitable receptacle.

When scale hopper 30 is out of balance the scale beam rotates in a clockwise direction until it strikes stop 66, at which position the rod 60 closes switch 68, thereby opening main gate 22, precision gate 26, and rotating drum 16. Since main gate 22 is already full of raisins, and by adjustment of divider 28 this quantity can be fixed to correspond to the charge necessary to pivot scale beam 32 to its stable intermediate position, it is apparent that the stabilizing hesitation when gate 22 closes and fills up can be advantageously utilized, not only to stabilize scale beam 32 but to prime the feed gate for the next charge.

While what hereinbefore has been described is the preferred embodiment of this invention, it is readily apparent that many changes and modifications can be resorted to without departing from the scope of this invention, and such changes and modifications are intended to be included in the following claims.

I claim:

1. A weighing machine comprising: a scale beam, a fulcrum upon which said beam is supported, a scale hopper retained at one extremity of said beam, a weight attached to said beam on the opposite side of said fulcrum from said scale hopper, said scale beam formed so that said weight is below the level of said fulcrum when said scale beam is in a balanced position, a control hopper positioned above said scale hopper, an inclined main feed gate located in said control hopper to permit passage of a primary charge of material to said scale hopper, a precision feed gate adjacent and below said inclined main feed gate to permit passage of a secondary charge to said scale hopper upon closing of said main feed gate, and an adjustable divider between said main and precision gates to cause a delay between passage of said primary and secondary charges to said scale hopper.

2. A weighing machine comprising: a scale beam, a fulcrum upon which said beam is supported, a scale hopper retained at one extremity of said beam, a weight attached to said beam on the opposite side of said fulcrum when said scale beam is in a balanced position, a control hopper positioned above said scale hopper, a main feed gate in said control hopper, a precision feed gate adjacent said main feed gate, means directing material to be weighed to said main feed gate, said material overflowing into said precision feed gate when said main feed gate is closed, adjustable dividing means between said main and precision gates to control the time necessary to fill said main feed gate prior to overflow into said precision feed gate.

3. In a weighing device of the type having a control hopper feeding material to be weighed to a receptacle mounted adjacent one extremity of a scale beam the combination with said control hopper of a main feed gate delivering a primary charge of material to said receptacle, a secondary feed gate adjacent and below said main feed means delivering a secondary charge of material to said receptacle when said main feed gate is closed, and an adjustable divider between said main and secondary feed gates to cause a delay between delivery to said receptacle of said primary and secondary charges.

4. In a weighing device of the type having a control hopper feeding material to be weighed to a receptacle mounted adjacent one extremity of a scale beam the combination with said control hopper of a main feed gate delivering a primary charge of material to said receptacle, a secondary feed gate adjacent said main feed means delivering a secondary charge of material to said receptacle when said main feed gate is closed, and an adjustable divider between said main and secondary feed gates to cause a delay between delivery to said receptacle of said primary and secondary charges.

5. A weighing machine comprising: a scale beam, a fulcrum upon which said beam is supported, a scale hopper retained at one extremity of said beam, a weight attached to said beam on the opposite side of said fulcrum from said scale hopper, said scale beam formed so that said weight is below the level of said fulcrum when said scale beam is in a balanced position, a control hopper positioned above said scale hopper, a main feed gate located in said control hopper to permit passage of a primary charge of material to said scale hopper, a precision feed gate adjacent said main feed gate to permit passage of a secondary charge to said scale hopper upon closing of said main feed gate, and an adjustable divider between said main and precision gates to cause a delay between passage of said primary and secondary charges to said scale hopper.

References Cited in the file of this patent

UNITED STATES PATENTS

| | | |
|---|---|---|
| 669,704 | Perry | Mar. 12, 1901 |
| 994,265 | McLeod | June 6, 1911 |
| 1,300,274 | Jeffries | Apr. 15, 1919 |
| 1,350,611 | Kader | Aug. 24, 1920 |
| 1,883,233 | Richard | Oct. 18, 1932 |
| 1,949,721 | Klopsteg | Mar. 6, 1934 |
| 1,981,697 | Hartmann | Nov. 20, 1934 |
| 2,058,775 | Cundall | Oct. 27, 1936 |
| 2,097,551 | Garlinghouse | Nov. 2, 1937 |
| 2,137,334 | Dorrington | Nov. 22, 1938 |
| 2,212,419 | Harmon | Aug. 20, 1940 |
| 2,227,788 | Loshak | Jan. 7, 1941 |
| 2,464,545 | Ahlburg et al. | Mar. 15, 1949 |

FOREIGN PATENTS

| | | |
|---|---|---|
| 492,634 | Great Britain | Sept. 23, 1938 |